United States Patent [19]

Shiohata et al.

[11] 4,435,770

[45] Mar. 6, 1984

[54] VIBRATION DIAGNOSING METHOD AND APPARATUS FOR A ROTARY MACHINE

[75] Inventors: Koki Shiohata, Ibaraki; Fumio Fujisawa, Mito; Motohiro Shiga, Hitachi; Kazuo Sato, Kitaibaraki; Motoji Ohmori, Hitachi; Masakazu Takasumi, Ibaraki, all of Japan

[73] Assignee: Hitachi, Ltd., Tokyo, Japan

[21] Appl. No.: 245,517

[22] Filed: Mar. 19, 1981

[30] Foreign Application Priority Data

Mar. 19, 1980 [JP] Japan ................................. 55-34032

[51] Int. Cl.³ ...................... G06F 15/46; G01N 29/00
[52] U.S. Cl. .................................... 364/508; 364/494; 73/462
[58] Field of Search ................. 364/508, 494; 73/462, 73/579, 593

[56] References Cited

U.S. PATENT DOCUMENTS

| | | | |
|---|---|---|---|
| 3,938,394 | 2/1976 | Morrow et al. | 364/508 X |
| 4,109,312 | 8/1978 | Beutel | 364/550 X |
| 4,135,244 | 1/1979 | Davis | 364/508 |
| 4,153,198 | 5/1979 | Eki et al. | 364/494 X |
| 4,184,205 | 1/1980 | Morrow | 364/508 |
| 4,262,536 | 4/1981 | Orem et al. | 364/508 X |
| 4,302,813 | 11/1981 | Kurihara et al. | 364/508 |

OTHER PUBLICATIONS

Measure Machinery Vibration, A. B. Kaufman, Instruments & Control Systems, Feb. 1975, pp. 59-62.

*Primary Examiner*—Edward J. Wise
*Attorney, Agent, or Firm*—Antonelli, Terry & Wands

[57] ABSTRACT

A method and apparatus for diagnosing a vibration in a rotor of the rotary machine including detecting the number of rotations and the vibration in the rotor when the rotor is rotating, extracting a vibration component synchronized with the number of rotations, determining whether the vibration component is normal or abnormal, calculating an abnormal vibration component through a vector operation by using the detected vibration component and a previously determined rotor vibration component in a normal state of the rotor, when the detected vibration component is judged to be abnormal, normalizing a vibration pattern of the abnormal vibration component, and determining an unbalance originating position in the rotor, which generates the abnormal vibration, by using a comparison of the normalized abnormal vibration pattern with a normalized vibration pattern of a previously determined unbalanced vibration.

14 Claims, 11 Drawing Figures

VIBRATION DIAGNOSING METHOD AND APPARATUS FOR A ROTARY MACHINE

The invention relates generally to a vibration diagnosing method for a rotary machine and an apparatus for executing the method. The invention relates particularly to a method which diagnoses an abnormal vibration caused by an unbalance occurring in a rotating shaft of a rotor in a rotary machine by detecting the number of rotations when the rotary machine is rotating and a vibration in the rotor and, as a result of the diagnosis, obtains an unbalance position and an unbalance quantity, and an apparatus for executing the method.

This type of the technique is applicable for the maintenance of the rotary machine such as a turbine.

Particularly in recent years, as an atomic or thermal power plant increases in size, a high reliability of the turbine/generators as principal equipment becomes more important. For a smooth power supply, it is essential to enable quick maintenance of the equipment after a failure has occurred. Therefore, the vibration diagnosis of this type of rotary machine is extremely of significant noting that trouble occur in a rotary machine due to various causes and exhibits different types of abnormal phenomena. Of those abnormal phenomena, abnormal shaft vibration inter alia is predominant, frequently leading to serious troubles.

A shaft system used in a power plant, such as the turbine/generator, constitutes a long and large scale system. Therefore, if a trouble occurring in the system is sensed, it takes an extraordinarily long time to find out a trouble position and a scale of the trouble.

With the above background, there has been a great demand for the development of a vibration diagnosing technique which can at an early point in time find an abnormality in the shaft on the basis of a vibration of the shaft to diagnose its trouble position and a quantity of the abnormal vibration, for the purpose of the improvement of a reliability of the rotary machine and of rationalizing the maintenance and inspection of the rotary machine. Particularly, the abnormal vibration occurring in the shaft contains much of the vibration component synchronized with the number of rotations, i.e. an unbalance vibration. Therefore, it is urgent to develop an effective diagnosing technique to find and estimate the generating position of the unbalance vibration as an unbalance vibration source, and the vibration quantity.

So long as we know, there has been only an approach for diagnosing the unbalance originating position in which a relationship between the number of rotations and a journal vibration is depicted on the polar coordinates for its monitoring over an entire range of the running of the rotary machine and the unbalance originating position is estimated from a feature of a profile of the relationship depicted. This approach, however, is limited in its unbalance pattern generated and not satisfactory in its accuracy of estimating the unbalance originating position. Further, a monitoring speed range for the rotary machine is too wide. Accordingly, this approach gives insufficient effects also in monitoring the unbalance quantity generated.

Accordingly, an object of the present invention is to provide a vibration diagnosing method for a rotary machine which can judge an unbalance originating position as an unbalance vibration source in the rotor of the rotary machine from the abnormal vibration generated in the rotor, and realizes a smooth running of the rotary machine and ease of the maintenance.

Another object of the present invention is to provide an apparatus for executing the vibration diagnosing method for rotary machines.

According to the present invention, there is provided a vibration diagnosing method for a rotary machine for diagnosing a vibration in a rotor of the rotary machine by detecting the number of rotations and the vibration in the rotor when the rotor is rotating and an apparatus for executing the method are based on an idea involving means for extracting from a rotor vibration an unbalance vibration synchronized with the number of rotations of the rotor, means which, when the unbalance vibration is abnormal, obtains through a vector operation only the abnormal vibration component by vector-operating previously stored rotor vibration components in a normal state and the unbalance vibration component, and normalizes the abnormal vibration component obtained, and means for calculating an unbalance vibration originating position in the rotor where the abnormal vibration is generated, on the basis of the comparison of the normalized abnormal vibration with the normalized unbalance vibration previously stored.

Such a scheme rapidly judges an abnormal vibration generated in the rotary machine and rapidly specifies an unbalance vibration originating position as an unbalance vibration source, thereby to ensure a smooth and stable operation of the rotary machine.

The present invention further involves means for calculating quantity of the unbalance generated at the unbalance vibration originating position on the basis of the abnormal vibration component vector-operated and the unbalance vibration previously stored. This means specifies the unbalance quantity of the unbalance vibration generated.

Figure 1:
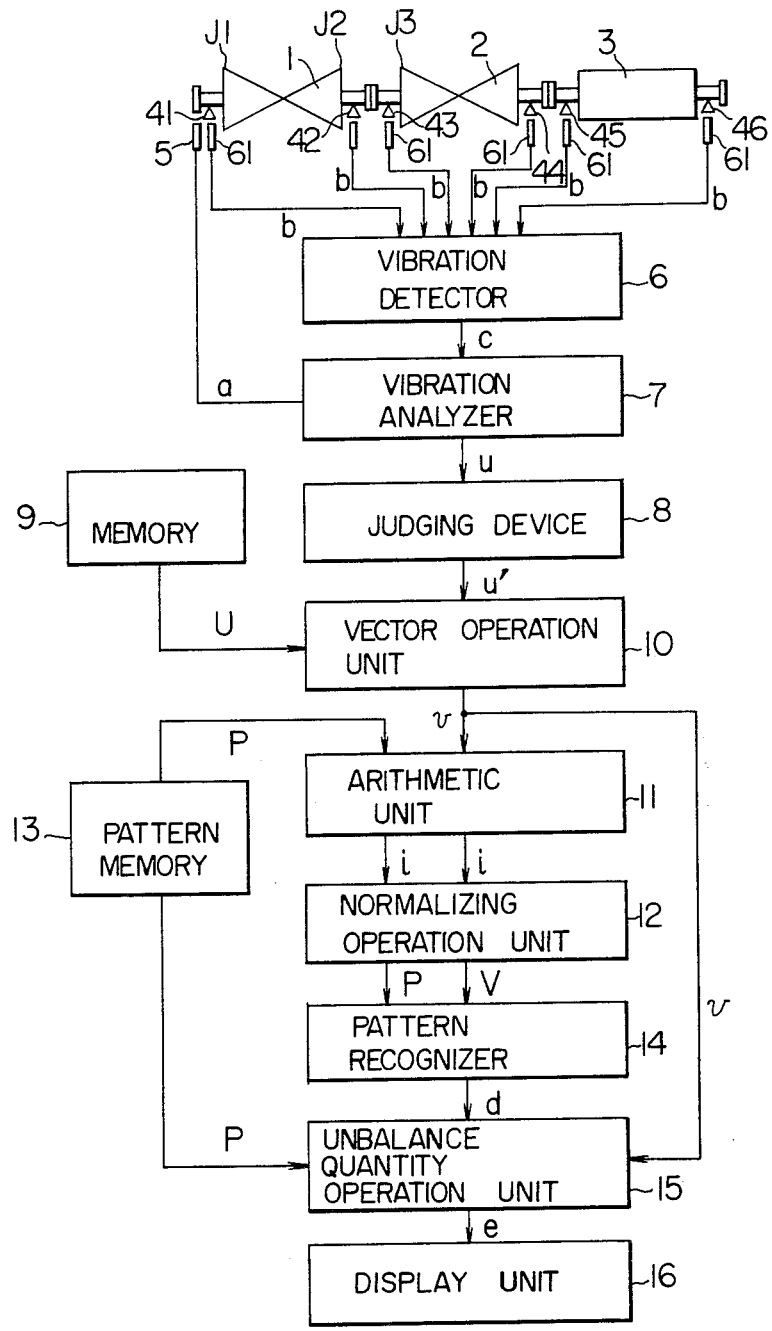
FIG. 1 is a block diagram of an embodiment of a vibration diagnosing apparatus for a rotary machine according to the present invention.

Embodiments of a vibration diagnosing method for a rotary machine and its apparatus according to the present invention will be described referring to the drawings. A vibration diagnosing technique for a turbine rotor in a turbine power plant is treated as the embodiment in the specification. FIG. 1 illustrates in block form a construction of the vibration diagnosing apparatus according to the present invention. In the figure, reference numerals 1 and 2 designate turbine rotors; 3 a generator rotor; 41 to 46 bearings for supporting the respective rotors.

The vibration diagnosing apparatus according to the invention diagnoses the dynamic health of the rotor by detecting the number of rotations of each of the rotors 1, 2 and 3 as shown when those are rotating and by a journal vibration at each of the bearings 41 to 46 for the rotors. A rotation sensor 5 is provided for detecting the number of rotations or a rotor speed of the rotor 1. The sensor 5 is so designed to sense the number of rotations of the rotor when the rotor speed is increased or decreased. In the present embodiment, the sensor 5 is disposed close to the bearing 41 of the turbine rotor 1 so as to sense the number of rotations of the rotor 1. A signal from the sensor 5 is also used as a phase reference signal a for extracting an unbalance vibration component from a vibration signal through an analyzing process of the vibration signal. A vibration detector 6 is provided for sensing the journal vibrations at the bearings 41 to 46. In the present embodiment, sensors 61 for sensing rotor vibrations are provided for the bearings, respectively, and signals b from the respective sensors 61 are applied to the vibration detector 6. A vibration signal c from the vibration detector 6 is applied to a vibration analyzer 7 where it is analyzed to extract an unbalance vibration component u synchronized with the number of rotations. A vibration state depends on the number of rotations. In the present embodiment, therefore, the measured vibration signal c is analyzed with respect to the number of rotations and the result of the analysis is sent to a judging device 8. The analysis is conducted on the basis of the phase reference signal a derived from the rotation sensor 5 and the vibration signal c from the vibration detector 6. The judging device 8 judges whether an unbalance vibration component u as the result of the analysis in the analyzer 7 is normal or not. Since the component u is already compared with the reference signal a representing a tolerable vibration, the judging device 8 is so designed as to inhibit the component u from passing therethrough when it is within a tolerable range, and to permit it to pass therethrough only when it is abnormal. Accordingly, when the component u is judged to be abnormal by the device 8, the device 8 produces an abnormal unbalance vibration component u' for transfer to a vector operation unit 10. When the component u is abnormal, u'=u, while when it is normal, u'=0. The vector operation unit 10 extracts only an abnormal vibration component v through a vector operation of the abnormal unbalance component u' with a normal vibration u. Specifically, since the component u' contains the normal vibration component u, the unit 10 compares the component u' with the normal vibration to extract only the abnormal vibration component v. To this end, it is necessary to clearly define the normal vibration U in the apparatus. In the present embodiment, this is realized such that the normal vibrations at the bearings 41 to 46 in a normal state are previously stored in a memory 9 and the normal vibration signal U is supplied from the memory 9 to the vector operation unit 10. In this way, only the abnormal vibration component v due to the unbalance generated in any of the rotors 1, 2 and 3 is extracted. The component v is further sent to an arithmetic unit 11 for determining a maximum amplitude generating position k where a position k representing the maximum amplitude of the abnormal vibration component v extracted. The unbalance vibration component v is applied to a normalizing operation unit 12, as a reference of the maximum amplitude generating position k obtained by the arithmetic unit 11. In the normalizing operation unit 12, the component v is normalized by the maximum amplitude. The normalization is required to compare various vibration patterns with the normal vibration component, and the principle of this will be described later. A signal normalized by the operation unit 12, that is, an abnormal vibration pattern V, is transferred to a pattern recognizer 14 where it is compared with various unbalance vibration patterns P previously stored in a pattern memory 13. Influence coefficients each representing a vibration at each bearing journal when a unit unbalance is applied to a point on each rotor 1, 2 and 3 as viewed in the axial direction are stored in the pattern memory 13. The influence coefficient pattern P transferred from the pattern memory 13 to the pattern recognizer 14 are normalized through the arithmetic units 11 and 12 to be the normalized pattern P. Accordingly, the pattern recognizer 14 compares the normalized abnormal signal pattern V with the various normalized unbalance vibration patterns P, to estimate an unbalance generating position in the rotor. Thus, since the patterns P of the unbalance generated at various positions are previously stored in the pattern memory 13, if the signal pattern V of the normalized actual abnormal vibration is successively compared with the various unbalance vibration patterns P stored to select the pattern P most similar to the pattern V, a position on the rotor where an unbalance is intentionally produced for storing the pattern P is estimated as the position now providing the abnormal unbalance. A recognition result d thus obtained is transferred to an unbalance quantity (magnitude and angle) operation unit 15. Applied to the operation unit 15 are the influence coefficient from the memory 13 and the component u' in addition to the recognition result d. The operation unit 15 calculates an abnormal vibration quantity (magnitude and angle) at the abnormal vibration generating position and its principle will be described later. The unbalance position and the unbalance quantity e are displayed by a display unit 16 such as a line printer or a CRT display.

A principle of diagnosing the unbalance position and unbalance quantity in the present embodiment will be described hereinafter. Symbols used in the following description will be defined as below, for simplicity.

| | |
|---|---|
| k | Number representing the number of rotations (k = 1, 2, ..., K) |
| i | Number representing positions of bearings (i = 1, 2, ..., I) |
| j | Number representing positions of giving rise of unbalance (j = 1, 2, ..., J) |
| $U_i^{(k)}$ | Unbalance vibration when the k-th rotation at the bearing position i is normal |
| $u_i^{(k)}$ | Unbalance vibration when the k-th rotation at the bearing position i is abnormal |
| $v_i^{(k)}$ | Unbalance vibration component arising from only the unbalance when the k-th rotor speed at the bearing position i is abnormal |
| $V_i^{(k)}$ | Normalized $u_i^{(k)}$ (abnormal vibration pattern) |
| $p_{ij}^{(k)}$ | Vibration at the bearing position i at the k-th rotor speed when a unit unbalance is applied to the unbalance position j |
| $P_{ij}^{(k)}$ | Normalized $P_{ij}^{(k)}$ (unbalance vibration pattern) |
| \| \| | Amplitude of vibration |

(In the description of $V_i^{(k)}$ and $P_{ij}^{(k)}$, the term "normalize" means the maximum amplitude is set to 1)

Figure 2:
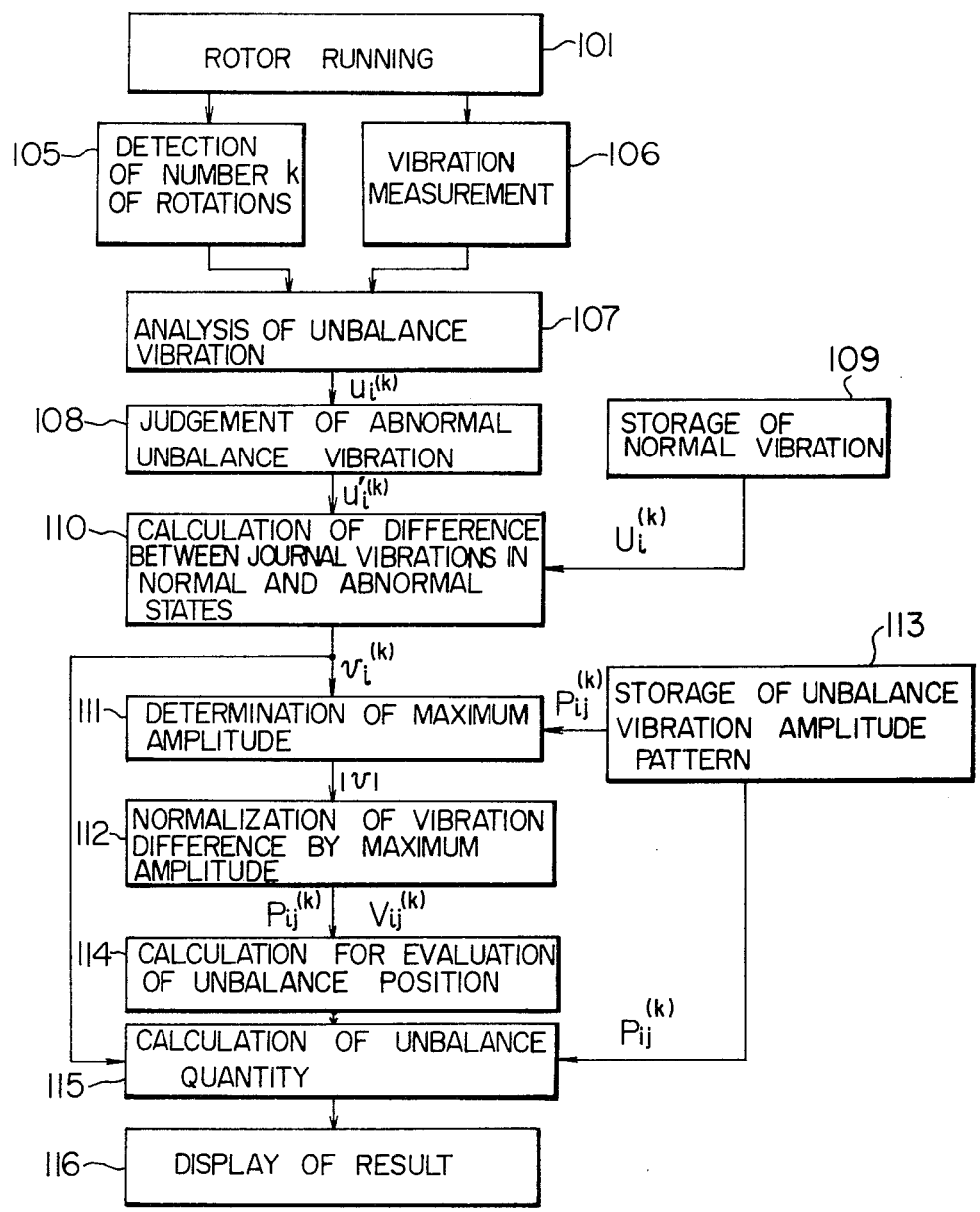
FIG. 2 is a flow chart for illustrating a flow of a diagnosing process in the vibration diagnosing apparatus shown in FIG. 1.

The description of the unbalance position and the unbalance quantity will be given in detail referring to FIGS. 1 and 2.

(1) Evaluation of Unbalance Position

Assume now that, when the rotor is running, the vibration and the number of rotations are being measured (see blocks 101, 105 and 106 in FIG. 2), an abnormal vibration occurs at the k-th rotor speed and the bearing position i. In a step 107, the abnormal vibration is sensed by the sensor 61 and detected by the vibration detector 6 and the detected abnormal vibration is applied from the detector 6 to the vibration analyzer 7. The analyzer 7, as described above, properly analyzes the vibration signal c from the vibration detector 6 with relation to the phase reference signal a from the rotation detector 5, to extract the unbalance vibration $u_i^{(k)}$. In a step 108, the judging device 8 compares the reference signal a with the unbalance vibration $u_i^{(k)}$. When the unbalance vibration is abnormal, the unbalance vibration $u_i^{(k)}$ passes through the judging device 8 to enter the vector operation unit 10 to calculate a difference between the vibrations of each journal in the normal and abnormal states (see step 110). The vector operation unit 10 performs the following calculation;

$$v_i^{(k)} = u_i^{(k)} - U_i^{(k)} \quad (1)$$

$(i=1, 2, \ldots, I)$

Through the above calculation, only the abnormal vibration component $v_i^{(k)}$ is extracted. In other words, the vector operation unit 10 removes the normal vibration component $U_i^{(k)}$ from the unbalance vibration component $u_i^{(k)}$ to obtain only the abnormal vibration component $v_i^{(k)}$ (see steps 109 and 110). The abnormal vibration component $v_i^{(k)}$ is a vector quantity containing the information of phase and amplitude. A step 111 calculates by the arithmetic unit 11 a position where the abnormal vibration component $v_i^{(k)}$ has a maximum or peak amplitude and the maximum amplitude as well, in order to determine the maximum amplitude of the abnormal vibration component. That is, the maximum amplitude calculated is mathematically expressed by $$|v| = |v_i^{(k)}|_{max} \quad (2)$$

$(i=1, 2, \ldots, I)$

In order to normalize the vibration difference by the maximum amplitude, a step 112 performs the following operation by the normalizing operation unit 12, $$V_i^{(k)} = v_i^{(k)}/|v| \quad (3)$$

$(i=1, 2, \ldots, I)$

As a result, the $V_i^{(k)}$ is a vector quantity containing phase and amplitude, exhibiting a vibration amplitude pattern of $|V_i^{(k)}|_{max}=1$ (k: constant). This indicates that the vibration difference is normalized.

Figure 3:
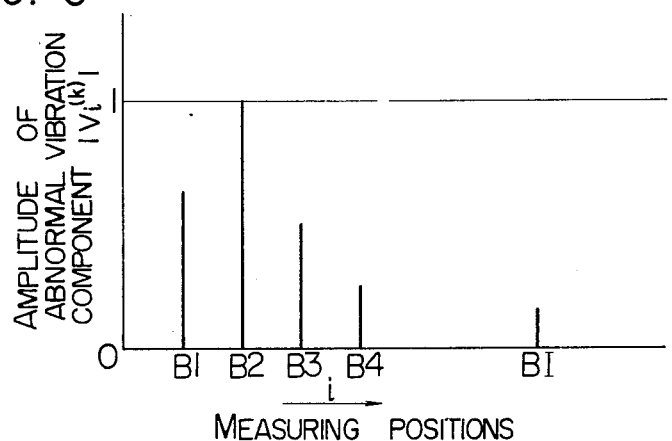
FIG. 3 is a graphical representation of a vibration pattern of a normalized abnormal vibration component by the apparatus shown in FIG. 1.

An example of the vibration amplitude pattern is illustrated in FIG. 3. In the graph depicted for k rpm of the rotor speed, the abscissa represents measuring positions and B1, B2, . . . BI corresponding to data at the bearing positions 41 to 46 shown in FIG. 1. The ordinate represents the vibration amplitude $|V_i^{(k)}|$ of the abnormal vibration component normalized. For example, even the maximum amplitude is 1, like B2.

As described above, the pattern memory 13 stores the influence coefficients $p_{ij}^{(k)}$ when a unit unbalance is applied to the various unbalance positions j (j=1, 2, . . . , J). The influence coefficient $p_{ij}^{(k)}$ is also a vector quantity containing the information of phase and amplitude. The influence coefficient $P_{ij}^{(k)}$ normalized through the units 11 and 12 is determined to have a pattern of the vibration amplitudes with respect to the unbalance positions, with $|P_{ij}^{(k)}|_{max}=1$ (i and k: constant).

Figure 4:
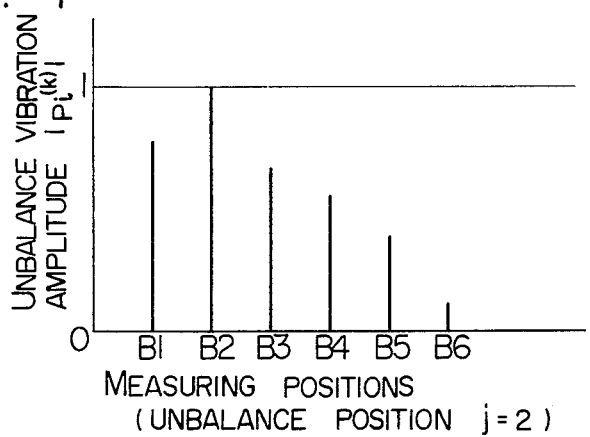
FIGS. 4 and 5 are graphs for representing normalized vibration patterns previously stored in the apparatus shown in FIG. 1.
Figure 5:
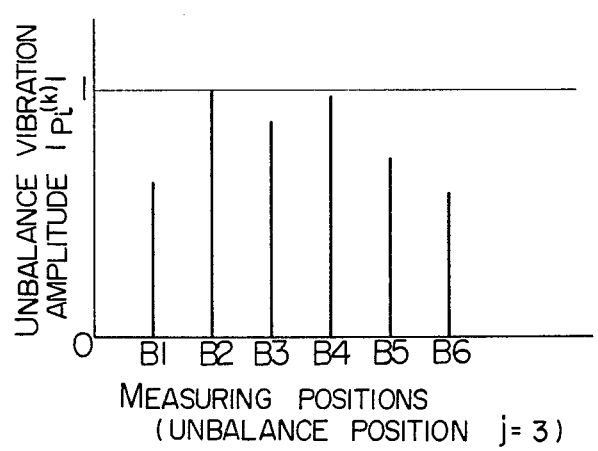

An example of the pattern is illustrated in a bar graph shown in FIGS. 4 and 5. The graphs of FIGS. 4 and 5 are plotted when the number of rotations is k rpm. The graph of FIG. 4 indicates that when the unbalance occurs at a position j=2, i.e. at j2 in FIG. 2, the unbalance vibration amplitudes of B1 to B6 are present at the bearings 41 to 46, respectively. The graph in FIG. 5 indicates that when the unbalance takes place at a position j=3, i.e. at j=3 in FIG. 2, the bearings 41, 42, . . . , 46 have unbalance vibration amplitude as shown, respectively. The abscissa represents measuring positions, as in the case of FIG. 3, and B1 to B6 correspond to the bearings 41, to 46, respectively. The ordinate repesents the unbalance vibration amplitude $|V_i^{(k)}|$ of which the maximum amplitude takes 1 as a result of the normalization. A step 113 is as mentioned above. The pattern recognizer 14 makes a pattern recognition of the abnormal vibration pattern properly processed after actually measured, i.e. the abnormal vibration amplitude pattern, with relation to the unbalance vibration amplitude pattern $|P_{ij}^{(k)}|$ previously stored, thereby to evaluate the unbalance position. As described above, since the various patterns $|p_{ij}^{(k)}|$ when the unit unbalance is applied to specific various positions j are stored in the pattern memory 13, the normalized the patterns $|P_{ij}^{(k)}|$ are compared with the abnormal vibration pattern $|V_i^{(k)}|$ resulting from the actually measuring, and the $|P_{ij}^{(k)}|$ most similar to $|V_i^{(k)}|$ is selected. In the present example, only the amplitude of the vibration is taken into account, while ignoring the phase information (although the example further taking account of the phase information will be described later) when the pattern comparison is performed. The pattern comparing operation in the present example will be given below.

The amplitude pattern $|V_i^{(k)}|$ of the abnormal vibration are arranged in order of the magnitudes of them, $|V_{i1}^{(k)}|, |V_{i2}^{(k)}|, \ldots, |V_{iI}^{(k)}|$. Then, a combination (i1, j) satisfying i=i1 is obtained from the unbalance vibration amplitude pattern $|p_{ij}^{(k)}|$. Additionally, a combination (i2, j') satisfying i=i2 for j satisfying i=i1 is obtained. Subsequently, this operation is successively repeated. Finally, it is estimated that the vibration amplitude pattern with the combination (i, j) of the largest number of the repetitions is most similar to the abnormal vibration amplitude pattern produced in the rotor.

In other words, from the various unbalance vibration amplitude patterns $|P_{ij}^{(k)}|$ stored, a pattern in which the bearing position having the maximum amplitude is i1 is selected, and from the pattern selected a pattern in which the bearing position with the second amplitude is i2 is selected. In this way, patterns for the third, fourth amplitudes, . . . will be selected successively. Finally, a pattern finally left is estimated to be closest in configuration to the abnormal amplitude pattern occuring in the rotor. Accordingly, the unbalance position of the most analogous pattern of those patterns stored represents the actual unbalance position in the rotor.

Then, the following operation of the abnormal vibration amplitude $|V_i^{(k)}|$ and the unbalance vibration amplitude $|P_{ij}^{(k)}|$, which results from the normalization of the unbalance vibration amplitude $|P_{ij}^{(k)}|$ at the respective positions, is performed $$S_j = \sum_{i=1}^{I} (|P_{ij}^{(k)}| - |V_i^{(k)}|)^2 \quad (4)$$

$$(j = 1, 2, \ldots, J)$$

$$R_j = \sqrt{S_j/I} \quad (5)$$

$$(j = 1, 2, \ldots, J)$$

The equations (4) and (5) indicate how the normalized $|P_{ij}^{(k)}|$ of the unbalance vibration amplitude pattern stored and applied is deviated from the actual abnormal vibration amplitude $|V_i^{(k)}|$ in the rotor. Accordingly, of those positions j in the various memory pattern $|p_{ij}^{(k)}|$, the position j with the least $S_j$ and $R_j$, that is, the position j with the least deviation, represents the actual unbalance position.

Therefore, the unbalance position in the rotor may be diagnosed on the basis of the unbalance position obtained by the (i, j) combination and by the unbalance position providing the least values in the equation (4) or (5). An example of this pattern recognition is illustrated in Table I.

TABLE I

| Unbalance position j | Unbalance Position Evaluation by Pattern Recognition | | | |
|---|---|---|---|---|
| | Amplitude peak position, i | | Order of S or R (from small to large) | Judgement |
| | $\|V_i^{(k)}\| = 1$ | $\|P_{ij}^{(k)}\| = 1$ | | |
| 1 | B2 | B1 | 3 | x |
| 2 | B2 | B2 | 1 | o |
| 3 | B2 | B2 | 2 | Δ |
| 4 | B2 | B3 | 4 | x |
| 5 | B2 | B4 | 5 | x |
| . | . | . | . | . |
| . | . | . | . | . |
| J | B2 | BI | J | X |

In Table I, o in the judgement column indicates that the unbalance position is establised. Δ indicates high possibility of the unbalance position. x indicates no possibility of the unbalance position. Table 1 shows that the abnormal vibration amplitude having the peak value of those $|V_i^{(k)}|$ from the respective bearings 41 to 46, B2, that is, the data from the bearing 42. The table further shows that when the unit unbalance is applied to the unbalance positions j1, j2, ..., the amplitude patterns having the maximum amplitudes of those unbalance vibration amplitude patterns $|p_{ij}^{(k)}|$ obtained from the bearings 41 to 46 as the detection positions or the normalized unbalance vibration amplitude patterns $|P_{ij}^{(k)}|$, are B1, B2, B3, B4, ... (i.e. those at the bearings 41, 42, 43 and 44) at the respective positions j1, j2, ... . Therefore, two positions where the amplitudes are equal and where the patterns are analogous are j2 and j3. It is estimated, therefore, that the actual unbalance is produced at either j2 or j3. Further, S or R representing the deviation having a least value is located at the position j2. There is a high possibility that the unbalance is at the position where the results of the above two judging operations are coincident with each other. The position j3, however, has the deviation which is second in order as counted from the least one. In addition, the coincident of the amplitude peak values holds at the position j3. Therefore, the judgement for the position j3 is a high possibility of the unbalance occurance. In this case, if the pattern recognition of FIG. 4 is applied for the second, third and subsequent amplitudes, in addition to the first or peak (maximum) amplitude, the judgement of the unbalance position is further improved in accuracy.

The quantity of the unbalance at the position j2, following the unbalance position judgement as mentioned above, will be given hereinafter.

(2) Calculation of the Unbalance Quantity

A case to be discussed is that, at k rpm of the rotor, the unbalance is produced at the position j2 and the abnormal vibration is sensed at B2 (or the bearing 42). A step 115 executes the task of determining the quantity of the unbalance produced at the position j2, by using the abnormal vibration component $v_i^{(k)}$ sensed from the bearings 41 to 46 and the unbalance vibration pattern $p_{ij}^{(k)}$ stored and applied. The calculation by the operation unit 15 follows.

A quantity of the unbalance produced at a point j is generally designed by $w_{jk}$ and is a vector quantity containing the magnitude and angle information. As mentioned above, the unbalance quantity to be discussed here is that at the position j2 and hence is denoted as $w_{j2}$. The abnormal vibration component $v_i^{(k)}$ detected is related, by the following equation, to the vibration pattern $p_{ij2}^{(i)}$ at the position j2 of those vibration patterns $p_{ij}^{(k)}$ stored and applied.

$$v_i^{(k)} = p_{ij2}^{(k)} \cdot w_{j2} \quad (6)$$

$$(i = 1, 2, \ldots I)$$

In the equation (6), when i=1, the unbalance quantity produced is $$w_{j2} = \frac{v_i^{(k)}}{p_{ij2}^{(k)}} \quad (7)$$

When i>1, the unbalance quantity $w_{j2}$ is unsatisfactorily defined by the equation (6). To define this, the method of least squares is used. Assumption is made that, when the unbalance quantity $w_{j2}$ is produced at the position j2, the detected abnormal vibration component $v_i^{(k)}$ is deviated by $\Delta v_i^{(k)}$. On the assumption, an evaluation function is defined. At this time, the equation (6) is rewritten into $$v_i^{(k)} + \Delta v_i^{(k)} = p_{ij2}^{(k)} \cdot w_{j2} \quad (8)$$

$$(i = 1, 2, \ldots, I)$$

The evaluation function J is $$J = \sum^{I} |\Delta v_i^{(k)}|^2 \quad (9)$$

As seen the unbalance quantity $w_{j2}$ to be calculated is the one to minimize the evaluation function J of the equation (9). To realize this, the equation (8) is substituted for the equation (9) and the J is partially differentiated by the $w_{j2}$ to make an obtained result equal to zero. As a result, the unbalance quantity can be obtained through the working out of the following equation.

$$\dot{w} = \{\bar{p}^T p\}^{-1} \bar{p}^T \dot{v} \quad (10)$$

where w is a vector quantity of the unbalance, p is a matrix of the influence coefficient (unbalance vibration pattern), v is a vector quantity of abnormal vector, and $p^T$ is a Hermite matrix of the p which is given by $$p = \begin{bmatrix} p_{1/2} \\ p_{2/2} \\ \cdot \\ \cdot \\ \cdot \\ p_{6/2} \end{bmatrix}^{(k)} \quad v = \begin{bmatrix} v_1 \\ v_2 \\ \cdot \\ \cdot \\ \cdot \\ v_6 \end{bmatrix}^{(k)}, \quad w = w_{/2} \quad (13)$$

(11)      (12)

Thus, through the judging operation for the unbalance position and quantity, it is possible to rapidly know the abnormal unbalance originating position in the rotor and a quantity or a degree of the abnormal unbalance. The judging operation for the unbalance position can be automated, thereby to greatly contribute to the automation of the trouble shooting in this field. Of course, this enables quicker and more reliable maintenance and inspection of the rotary machine.

Figure 6:
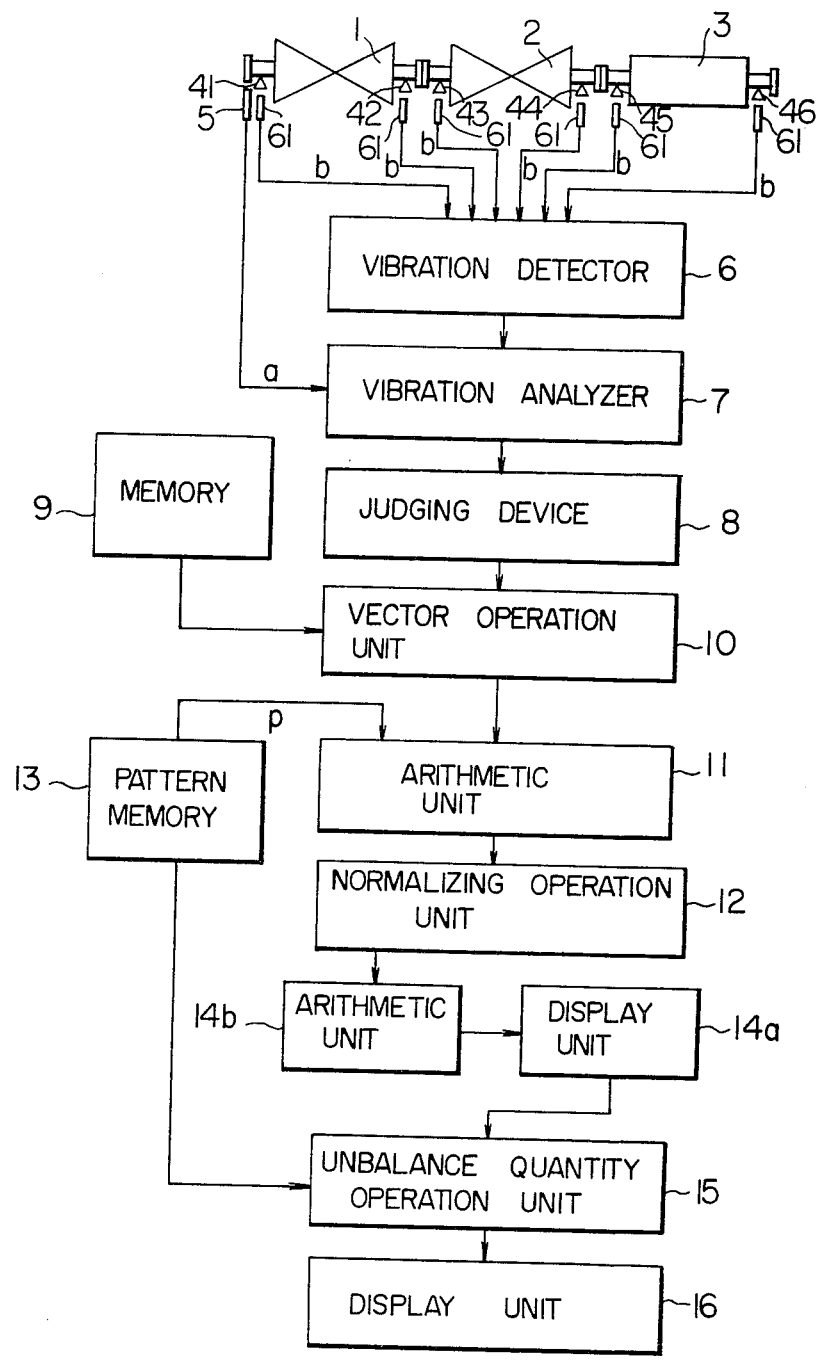
FIG. 6 is a circuit diagram of another embodiment of a vibration diagnosing apparatus for a rotary machine according to the present invention.
Figure 7:
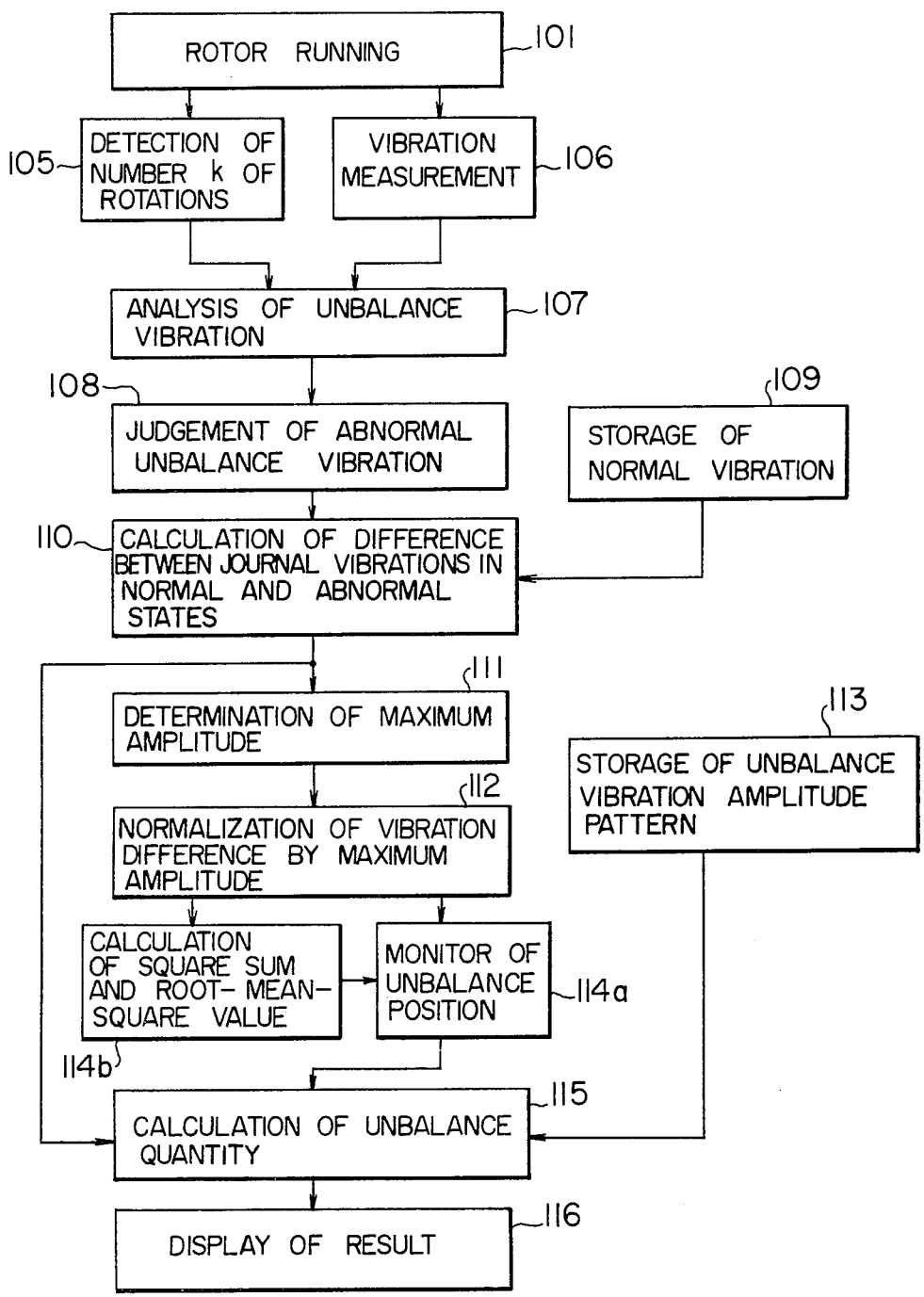
FIG. 7 is a flow chart for illustrating a flow of a diagnosing process by the apparatus shown in FIG. 6.

In the above-mentioned embodiment, the pattern recognizer 14 is used for diagnosing the unbalance position. An operator can make the pattern recognition, in place of the pattern recognizer 14. In this case, it is necessary to display the unbalance vibration amplitude pattern to help the operator in his pattern recognition. To illustrate the detail of this embodiment, a block diagram of the embodiment is shown in FIG. 6 and a flow chart of its process flow is illustrated in FIG. 7. Only differences of the present embodiment from that in FIGS. 1 and 2 will be described for simplicity. In the present embodiment, an operator judges the unbalance position after seeing the contents displayed on a display unit 14a, and keys the unbalance position into the diagnosing apparatus. Then, the inputted data is processed by the above-mentioned unbalance quantity determining procedure, and the result of the process is displayed.

Description will be given about a judging pattern used as a reference to judge the unbalance position by the operator.

On a screen of the display, the unbalance position j (j=1, 2, ..., J) and the measured unbalance are taken along the abscissa, while the bearing position number i (i=1, 2, ..., I) is along the ordinate. The abnormal vibration amplitude pattern $|V_i^{(k)}|$ and the normalized unbalance amplitude pattern $|P_{ij}^{(k)}|$ are concurrently displayed on the coorinates of the screen. After comparatively observing both the patterns, the operator distinctively finds out the most analogous pattern. In the judgement by the pattern comparison, only the amplitude is taken into account, while neglecting the phase information (an example by considering further the phase information will described later). The pattern judgement of this example will be made in the following manner.

Firstly, the abnormal vibration patterns $|V_i^{(k)}|$ are arranged in accordance with the bearing positions, and are numbered in the order from large to small, like {1, 2, 3, ... I}. Numbers are applied to the j of the unbalance vibration amplitude patterns $|p_{ij}^{(k)}|$ in accordance with the bearing positions, like {1, 2, 3, ..., I}j in the order from large to small. Those ordered numbers are displayed in the coordinates on the display screen. The operator successively compares the numbered patterns of the abnormal vibration amplitude patterns $|V_i^{(k)}|$ with those of the unbalance vibration amplitude patterns $|P_{ij}^{(k)}|$, to select the j of which the patterns are most analogous to each other. The j selected is estimated to be closest to the unbalance generating position in the rotor.

Then, the normalized abnormal vibration amplitude $|V_i^{(k)}|$ and the normalized unbalance vibration amplitude $|P_{ij}^{(k)}|$ at the respective unbalance positions are mathematically processed by the arithmetic unit 14b in accordance with the equations (4) and (5). This process is executed in the process step 114b of the square sum and root-mean-square value. The results of the calculations are displayed in the form of a bar graph on the screen of the display device 14a in which the unbalance generating positions j (j=1, 2, ... J) are taken along the abscissa and Sj and Rj defined by the equation (4) or (5) is along the ordinate. This process corresponds to a step 114b of monitor of unbalance position. The bar graph indicates how the stored unbalance vibration amplitude patterns are deviated from the actual abnormal vibration amplitudes. Therefore, the j having the least value of Sj or Rj is estimated to be closest to the actual unbalance generating position.

As described above, the operator can judge the actual unbalance generating position in the rotor on the basis of the unbalance position obtained from the graph representing the amplitude, and the unbalance generating positions on the abscissa and the actual measuring positions on the ordinate, and the unbalance position judged from the bar graphs obtained by the equation (4) or (5). Examples for this judgement are illustrated in FIGS. 8 and 9.

Figure 8:
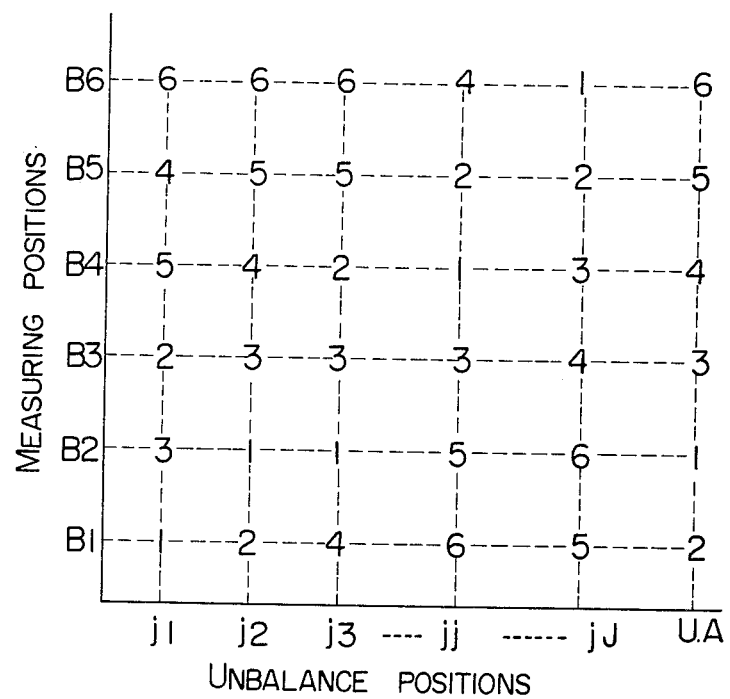
FIGS. 8 and 9 are graphs for illustrating a vibration pattern for specifying an unbalance vibration originating position by the apparatus shown in FIG. 6.
Figure 9:
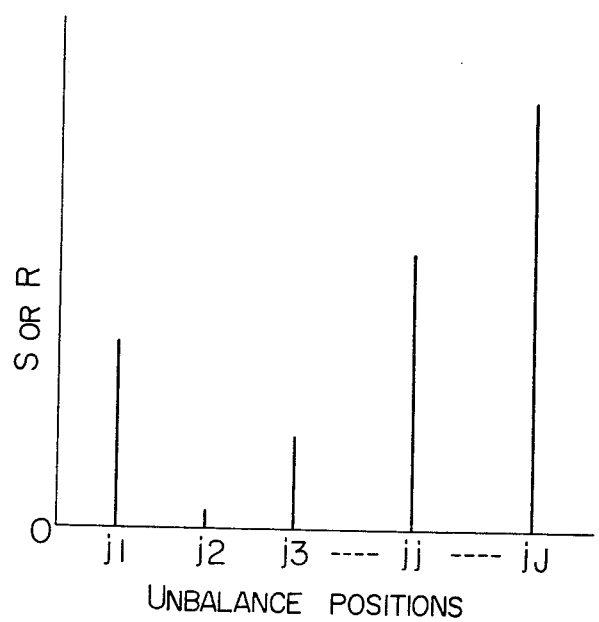

In FIG. 8, U.A. on the abscissa designates actually measured vibration amplitudes, U.A. has 1 representing the maximum amplitude at the position B2, 2 at the position B1 and 3 at the position B3. Similarly, numbers corresponding to the magnitudes of the amplitudes are applied for the unbalance positions j1, j2, ..., jI. at the position j2, the maximum amplitude position is at the bearing position B2, and the amplitudes are located at the B1, B3, B4, B6 and B5 in this order. This pattern is exactly the same as the abnormal vibration amplitude pattern actually measured. As a result, the unbalance position in the rotor is estimated to be j2 at high probability. Nevertheless, the pattern at the unbalance position j3 is also relatively analogous to the abnormal vibration amplitude pattern. Therefore, an example of qualitatively comparing the measured and stored vibration amplitude patterns by using the equation (4) or (5), is illustrated in FIG. 9. As shown, the unbalance position having the least deviation R or S is j2 and the deviation R or S increases in the order of j3, j1, ..., jj, ... jJ. Consequently, it can be estimated that the unbalance generating position is j2. Therefore, the operator judges that the unbalance generating position is the j2 at the highest probability, and then executes the operation of the quantity of the unbalance at the j2.

In this way, the abnormal unbalance orginating source in the rotor is always monitored by the display, and when the abnormal vibration takes place, the operator immediately checks it and determines the unbalance quantity.

Figure 10:
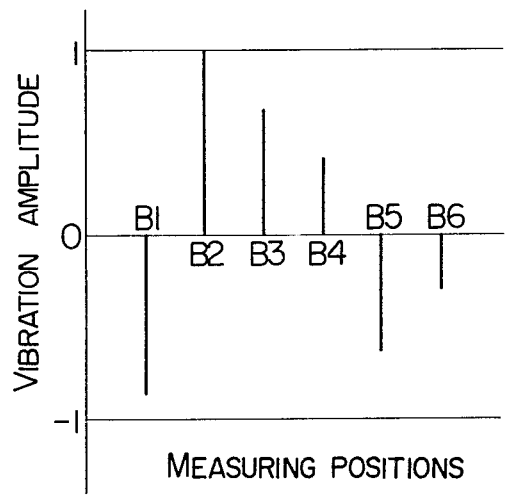
FIGS. 10 and 11 are graphs for illustrating another vibration pattern for specifying an unbalance vibration originating position by the apparatus shown in FIG. 6.
Figure 11:
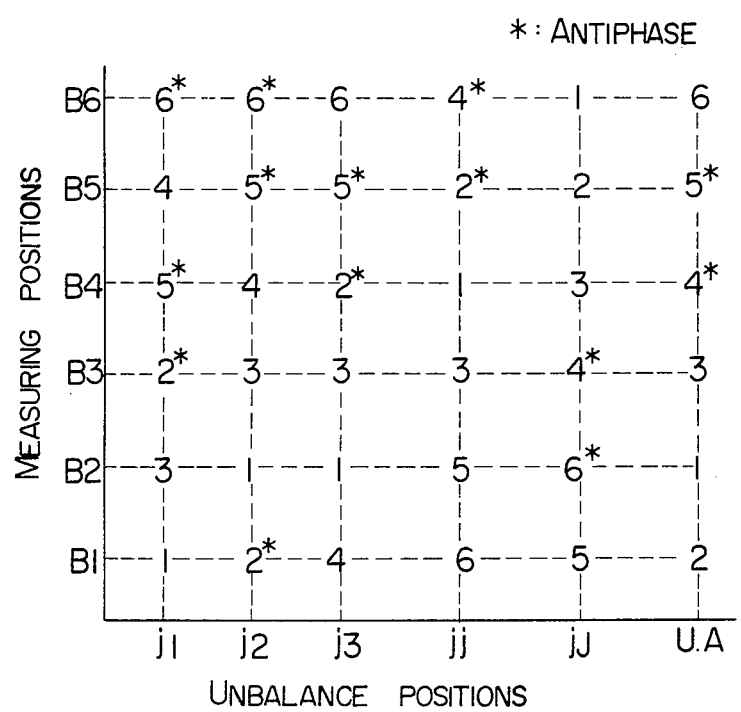

The above two embodiments diagnosed the unbalance generating position on the basis of only the vibration amplitude pattern, without considering the phase information. However, an effective diagnosis is possible by taking the phase information into account. In the case of the diagnosis by using the phase information additionally, the phase must be standardized with respect to the maximum amplitude (=0°) over all the positions in the axial direction. It is assumed that the phase range defined by $|\widehat{H}| \leq 90°$, where $\widehat{H}$ designates the standardized phase, is in-phase, while the phase range defined by $90° < \widehat{H} < 270°$ is antiphase. Accordingly, the patterns appearing as shown in FIGS. 3 and 8 becomes those shown in FIGS. 10 and 11 in the present embodiment. Further, $V_i^{(k)}$ and $P_{ij}^{(k)}$ replace $|V_i^{(k)}|$ and $|P_{ij}^{(k)}|$, respectively, in order that the vector quantity containing phase and amplitude is used for the data processing for the dynamic health of the rotary machine.

As described above, the diagnosing technique for the rotary machine rapidly judges the abnormal vibration taking place in the rotor of the rotary machine, and quickly finds out the unbalance position as the unbalance vibration generating source. Therefore, the present invention secures a smooth operation of various types of rotary machines.

What is claimed is:

1. An apparatus for diagnosing a vibration in a rotor of a rotary machine comprising:
    means for sensing the number of rotations of the rotor and providing an output indicative thereof;
    vibration detecting means for detecting vibration at a plurality of measuring points disposed at intervals along a direction of the rotor shaft when the rotor is rotating and providing outputs representative thereof;
    vibration analyzer means responsive to the outputs of the vibration detector means and the rotation sensor means for extracting vibration components synchronized with the number of rotations of the rotor at the plurality of measuring points;
    comparing means for comparing the extracted vibration components with reference values therefor corresponding to normal vibration of the rotor for determining that the detected vibration is abnormal when at least one of the extracted vibration components exceeds the corresponding one of the reference values therefor and that the detected vibration is normal when all of the extracted vibration components do not exceed the corresponding reference value therefor, the comparing means providing an output of the extracted vibration components when the detected vibration is abnormal;
    calculating means for calculating abnormal vibration components in accordance with the output of the extracted vibration components and predetermined values representative of respective rotor vibration components in a normal state of the rotor and providing an output of abnormal vibration components; and
    pattern comparing means for comparing a pattern of amplitude values of the abnormal vibration components with patterns of previously determined vibration amplitude values at the respective measuring points when an unbalance is provided at different positions of the rotor for determining an unbalance originating position in the rotor according to a selected one of the predetermined unbalanced vibration patterns which is the most similar to the abnormal vibration pattern.

2. An apparatus according to claim 1, further comprising memory means for storing the predetermined values representative of respective rotor vibration components in the normal state of the rotor, the calculating means for calculating the abnormal vibration components including first arithmetic means for obtaining the abnormal vibration components, second arithmetic means for determining which one of the plurality of abnormal vibration components has a maximum amplitude, and third arithmetic means for normalizing the abnormal vibration components on the basis of the one of the abnormal vibration components having the maximum amplitude.

3. An apparatus according to claim 2, further comprising pattern memory means for storing the patterns of previously determined vibration amplitude values at the respective measuring points when an unbalance is provided at different positions of the rotor, the stored patterns having the amplitude values thereof normalized in accordance with the maximum amplitude value.

4. An apparatus according to claim 3, wherein the first arithmetic means includes means for subtracting the stored predetermined values representative of respective rotor vibration components in the normal state of the rotor from the corresponding extracted vibration components so as to obtain the abnormal vibration components.

5. A method for diagnosing a vibration in a rotor of a rotary machine comprising the steps of:
    detecting the number of rotations and the vibration in the rotor at a plurality of measuring points disposed at intervals along a direction of the rotor shaft when the rotor is rotating and providing signals representative thereof;
    extracting vibration components synchronized with the number of rotations of the rotor from the signals representative of the detected vibration of the rotor at the plurality of measuring points;
    comparing the extracted vibration components with reference values therefor corresponding to normal vibration in the rotor of the rotary machine for determining that the detected vibration is abnormal when at least one of the extracted vibration components exceeds the corresponding one of the reference values therefor and that the detected vibration is normal when all of the extracted vibration components do not exceed the corresponding reference values therefor;
    calculating abnormal vibration components upon determining that the detected vibration is abnormal by subtracting predetermined values representative of respective rotor vibration components in a normal state of the rotor from the corresponding extracted vibration components so as to obtain abnormal vibration components; and
    comparing a pattern of amplitude values of the abnormal vibration components with patterns of previously determined vibration amplitude values at the respective measuring points when an unbalance is provided at different positions of the rotor for determining an unbalance originating position in the rotor according to a selected one of the predetermined unbalanced vibration patterns which is the most similar to the abnormal vibration pattern.

6. A method according to claim 5, wherein the step of calculating abnormal vibration components includes performing the subtracting in accordance with a vector operation.

7. A method according to claim 5, wherein the step of calculating abnormal vibration components includes normalizing the abnormal vibration components by setting the maximum value of the abnormal vibration components to one and setting the other values of the abnormal vibration components in accordance therewith.

8. A method according to claim 7, wherein the step of normalizing the abnormal vibration components includes setting the maximum amplitude value of the abnormal vibration components to one and setting the other amplitude values of the abnormal vibration components in accordance therewith.

9. A method according to claim 8, wherein the previously determined unbalanced vibration values are values normalized by setting the maximum value to one and setting the other values in accordance therewith, and the step of comparing to determine the unbalanced originating position includes selecting one of the predetermined unbalanced vibration patterns as the most similar pattern in accordance with a minimum one of a square sum value of differences between respective amplitudes of the abnormal vibration components and the corresponding amplitudes of the previously determined unbalanced vibration patterns.

10. A method according to claim 7, wherein the previously determined unbalanced vibration values are values normalized by setting the maximum value to one and setting the other values in accordance therewith, and the step of comparing to determine the unbalanced originating position includes selecting one of the predetermined unbalanced vibration patterns as the most similar pattern in accordance with the minimum one of a root mean square value of differences between respective amplitudes of the abnormal vibration components and the corresponding amplitudes of the previously determined unbalanced vibration patterns.

11. A method according to claim 5, further comprising the step of calculating the unbalanced quantity at the unbalanced originating position in accordance with the abnormal vibration components and the previously determined unbalanced vibration amplitudes.

12. A method according to claim 11, wherein the step of calculating the unbalanced quantity includes utilizing influence coefficients of the previously determined unbalanced vibration values.

13. A vibration diagnosing apparatus for rotary machine for diagnosting a vibration in a rotor of the rotary machine by detecting the number of rotations and the vibration in the rotor when the rotor is rotating, comprising:

a rotation sensor for sensing the number of rotations of the rotor;

a vibration detector for detecting a vibration generated in the rotor at a proper position of the rotor;

a vibration analyzer for extracting an unbalance vibration component synchronized with the number of rotations by using a vibration signal from said vibration detector and a phase reference signal obtained from said rotation sensor;

judging means for judging whether said unbalance vibration component is normal or abnormal by comparing an unbalance vibration component derived from said vibration analyzer with a reference value;

memory means for previously storing a rotor vibration component in a normal state;

first arithmetic means for extracting an abnormal vibration component on the basis of an abnormal unbalance vibration component derived from said judging means and a normal vibration component stored in and derived from said memory means;

second arithmetic means for specifying a maximum amplitude of an abnormal vibration component from said first arithmetic means;

third arithmetic means for normalizing said abnormal vibration component on the basis of the maximum amplitude of the abnormal vibration component derived from said second arithmetic means;

pattern memory means for previously storing the normalized pattern of the unbalance vibration;

unbalance originating position identifying means for identifying a position in the rotor where the unbalanced vibration causing the abnormal vibration is generated on the basis of the comparison of the normalized abnormal vibration pattern from said third arithmetic means with the normalized unbalanced vibration pattern from said pattern memory means.

14. A vibrating diagnosing apparatus according to claim 13, further comprising a fourth arithmetic means for calculating a quantity of the abnormal vibration generated at said unbalance position by using the abnormal vibration component derived from said first arithmetic means and influence component from said pattern memory means.

* * * * *